Figure 1:
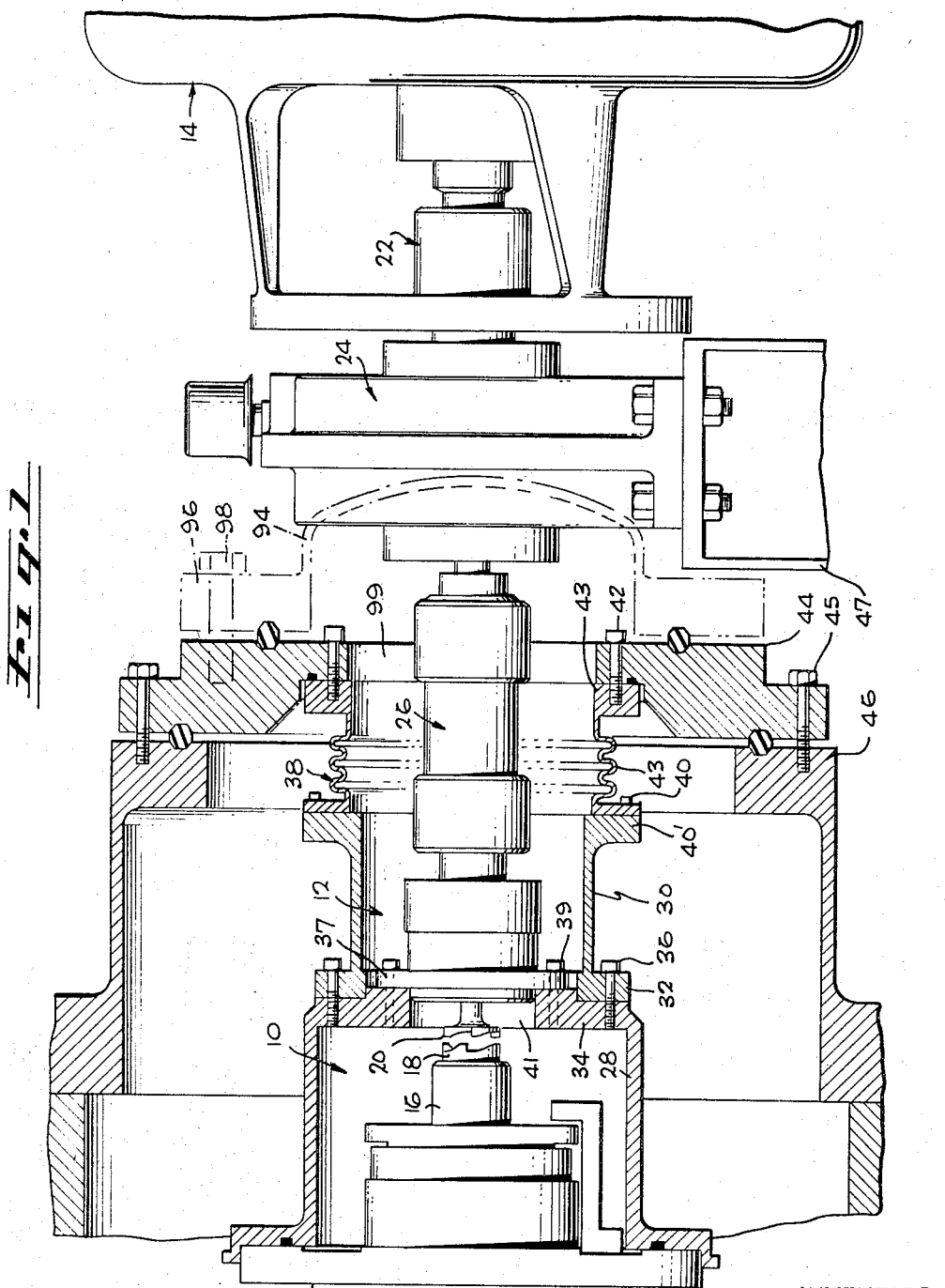

Oct. 31, 1967 J. K. LA FLEUR ET AL 3,350,060
TURBINE STARTING SYSTEM
Filed July 12, 1965 2 Sheets-Sheet 1

INVENTORS
JAMES K. LA FLEUR
ANGEL R. FLOREZ
BY
Mat Geldin
ATTORNEY

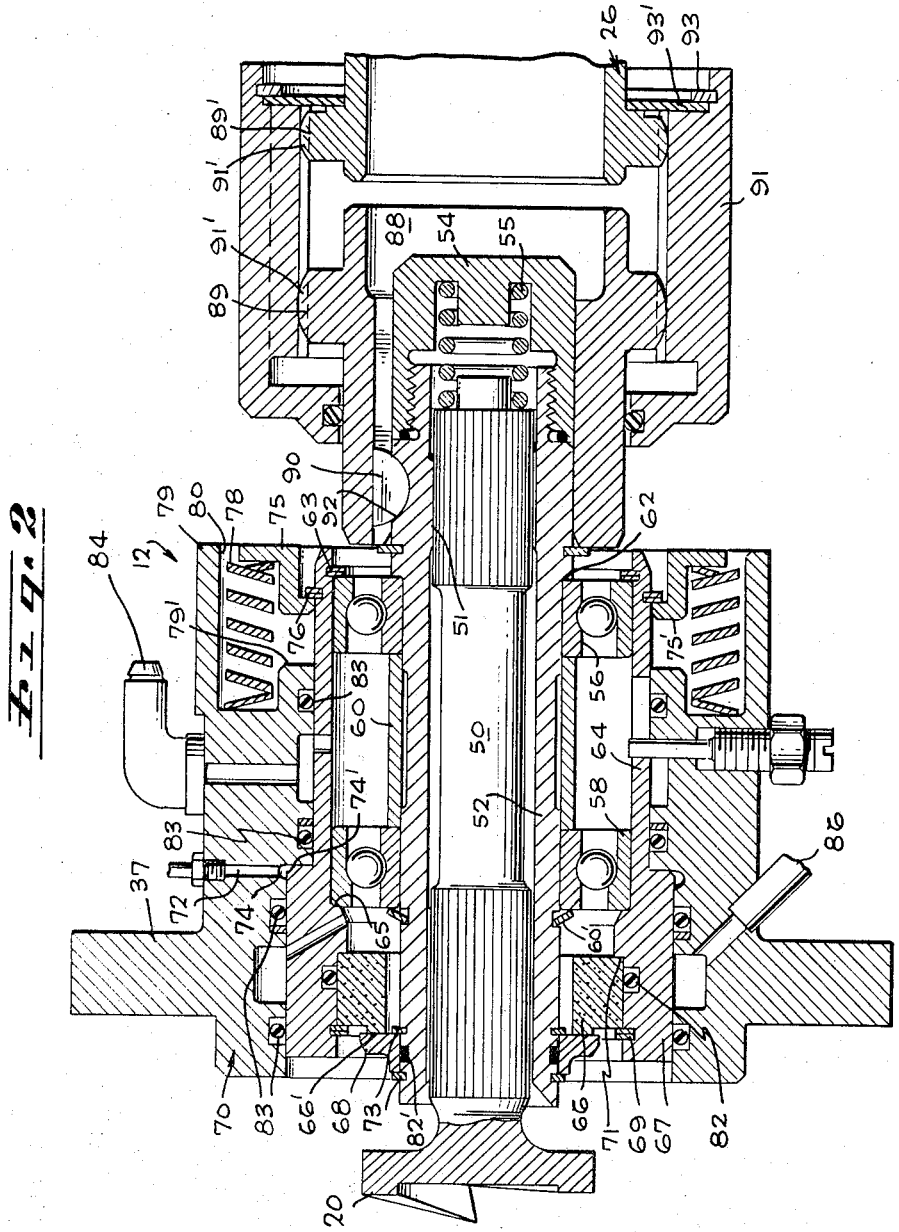

United States Patent Office 3,350,060
Patented Oct. 31, 1967

3,350,060
TURBINE STARTING SYSTEM
James K. La Fleur, Hermosa Beach, and Angel R. Florez, Downey, Calif., assignors to The La Fleur Corporation, Century City, Calif., a corporation of California
Filed July 12, 1965, Ser. No. 471,341
9 Claims. (Cl. 253—39)

This invention relates to a system for starting a turbine and bringing it up to a predetermined speed, and is particularly concerned with a starting system for closed cycle turbomachines which is highly versatile, relatively inexpensive, and which permits minimum leakage of gaseous medium from the turbine system.

Open cycle turbomachinery employing an inexpensive working medium such as air can be readily started and brought upto speed in a relatively short time, for example, in a period of a few minutes by means of relatively inexpensive starting motors, which remain connected to the turbine after the turbine has been brought up to the desired speed. In systems of this type, not only is the starting mechanism or starting motor relatively inexpensive, but since inexpensive working media are employed in the turbine system, whatever loss of working medium takes place during this operation and after the turbine has been brought up to speed and is in normal operation, is not economically significant.

However, unlike ordinary gas turbines operating on an open cycle, closed cycle turbomachinery such as that described in the copending application Ser. No. 273,910, now Patent No. 3,201,941, of James K. La Fleur, and employing a high pressure working medium operating at high temperatures, such as helium, small inexpensive starting motors cannot be employed to spin the turbine at the start of the operation in order to bring it up to proper speed, due to the fact that it requires substantially greater horsepower to rotate a closed cycle turbine of this type, and also it takes considerably more time to get the turbine up to proper temperature and speed, e.g., as much as 24 hours, as compared to the very short starting periods for open cycle turbomachinery.

Starting motors for closed cycle turbomachinery of the type described in the above referred to patent are very expensive machines and are generally only used at infrequent intervals to start such a system in operation, often times only once in a period of about six months, due to the long periods of operation of such turbomachinery. As heretofore practiced, such motor was fixedly secured to a clutch mechanism, and the entire assembly fixed to the turbine. In addition to maintaining the starting motor inactive for long periods of time, another disadvantage of this system is that either one had to accept leakage to the atmosphere through the rotating face seal on the clutch, or it was necessary to place a pressure vessel around the entire starting motor and clutch assembly to prevent such leakage. However, it is economically not feasible to build the type of pressure vessel needed around a motor fixed to the clutch of a turbomachinery system operating at pressures, e.g., of the order of 200 p.s.i., to prevent such leakage. On the other hand, it is very expensive to permit leakage of the working medium when using an expansive medium such as helium in a closed cycle system.

It is accordingly an object of the invention to provide a relatively inexpensive, versatile system for starting a turbine, particularly closed cycle turbomachinery operating with a high pressure expensive working medium such as helium, while minimizing losses of such working medium to the atmosphere.

Other objects and advantages will appear hereinafter.

According to the invention, a starting motor is provided which can be removably mounted onto one end of a clutch mechanism in turn mounted on the turbine, so that the motor can be connected to the clutch mechanism when the turbine is to be spun to start the system in operation, and after the turbine has been brought up to the proper speed and the system has reached equilibrium, the motor can then be removed, and the end of the clutch housing can be closed with a sealing cap to seal the system from the atmosphere and prevent gas leakage thereto. By practice of the invention, one motor can be employed to start a number of turbines at different locations and thus avoid the expense of a separate motor for each turbine, while at the same time avoiding gas leakage of expensive working medium to the atmosphere during normal operation of the turbine.

Briefly, the starting system of the invention comprises a turbine including a turbine housing and a turbine shaft, a clutch means connected to the turbine and including a clutch member mounted for engagement and disengagement with the turbine shaft, a housing for said clutch means, and connected to said turbine housing, a motor, means for removably coupling said motor in driving engagement with said clutch means, and removable cap means for enclosing the end of said clutch housing when the motor is disengaged from the clutch means and is removed from the end of the housing.

Means is provided for axially moving the clutch member into engagement with the turbine shaft and means is provided for retracting the clutch member to disengage same from the turbine shaft. Sealing means preferably is mounted on the clutch means to minimize gas leakage from the interior of the turbine housing into the interior of the clutch housing.

The invention will be more clearly understood from the description below of a preferred embodiment taken in connection with the accompanying drawings wherein:

FIG. 1 shows an assembly of the starting system according to the invention in combination with a turbine preferably operating in a closed cycle; and FIG. 2 shows a longitudinal section of the clutch mechanism employed in the starting system of FIG. 1.

Referring to FIG. 1 of the drawing, numeral 10 represents generally a turbine, e.g., of the type described in the above copending application Ser. No. 273,910, employed in a closed cycle turbomachinery system empolying, for example, helium as a working medium. Numeral 12 represents generally a clutch assembly of any suitable type, the structure of which is described in detail hereinafter, and numeral 14 represents a motor which is adapted to be assembled and arranged in removable fashion according to the invention, into driving engagement with the clutch assembly 12.

The shaft 16 of the turbine 10 is provided at one end with a toothed member 18 adapted to be engaged by mating toothed clutch member 20 of the clutch assembly 12 to drive the shaft 16 in starting the turbine. The motor 14 which supplies the power to drive the turbine shaft 16 through the clutch assembly 12, is connected to such clutch assembly through a coupling 22, a gear box 24, and another coupling 26.

The turbine 10 is provided with a housing 28 and the clutch assembly 12 is mounted within a clutch housing 30 having a flange 32 at its outer end which is attached to the adjacent end member 34 of the turbine housing 28, by means of bolts 36. The clutch assembly 12 carries a flange 37 which is connected by means of bolts 39 to end member 34 of the turbine housing, so as to mount the clutch assembly within the clutch housing 30. The toothed clutch plate 20 of the clutch assembly 12 extends through a central aperture 41 in the turbine end plate 34.

The clutch housing 30 carries a rearward extension 38 having a bellows type side wall 43, which is bolted at 40 to a flange 40'. Bolted at 42 to the rear flange 43 carried on housing extension 38 is an end plate 44 in turn bolted at 45 at its periphery to an outer housing 46. The gear box 24 is bolted to supports 47.

Referring now to FIG. 2 of the drawing showing the structure of the clutch mechanism 12, numeral 50 represents an elongated member or shaft at the forward end of which is integrally mounted the toothed clutch member 20. Shaft 50 of clutch mechanism is keyed at 51 to a sleeve 52, to the outer end of which is screwed an end cap 54. The shaft 50 accordingly is rotatable with the sleeve 52. A spring 55 is provided between the end cap and the end of member 50 to cushion shocks in an axial direction. A pair of bearings 56 and 58 are mounted on sleeve 52 and spaced from each other by means of a spacer 60. The bearings 56 and 58 are fixed axially on the sleeve 52 between the retaining ring 60' and the shoulder 62 on the sleeve 52.

Mounted on the bearings 56 and 58 for axial movement therewith is an outer sleeve 64 which is fixed axially with respect to such bearings by the retaining ring 63 and the shoulder 65 on sleeve 64, which abuts the outer face of the bearing 58. Sleeve 64 carries a flanged portion 67 at its forward end, and mounted within such flange 67 between a retaining ring 69 and a shoulder 71, is a carbon ring 66. The sleeve 52 carries at its forward end a face plate 68, e.g., composed of steel, and mounted between retaining rings 73, plate 68 being rotatable with the sleeve 52. The face ring 68 has one face thereof in engagement with an outwardly extending surface 66' of the carbon block 66.

In the structure described above it will be seen that shaft 50 carrying clutch member 20, sleeve 52, bearings 56 and 58, and outer sleeve 64 carrying the carbon block 66, are all arranged for simultaneous axial movement.

A fixed casing member 70 is provided which is mounted by means of the flange 37 on the turbine housing end member 34, as previously described. In casing member 70 there is provided an air passage 72 which is adapted to be connected to an air pressure source (not shown), the inner end of passage 72 communicating with a port 74 adjacent the inside surface 74' on the inner shoulder of the flange 67 of sleeve 64.

The inner end of the outer sleeve 64 carries an L-shaped ring 75 which is maintained in position on the sleeve 64 by means of a retaining ring 76, and a compression spring 78 which is mounted within a pocket 80 formed by a rearwardly extending member 79 connected to the fixed casing 70. Spring 78 urges the ring 75 against its retainer ring 76.

From the structure described above, it will be seen that when air pressure is introduced through passage 72 into the port 74 and against the face 74' of the flange 67, flange 67 and the sleeves 64, together with members 52, 50 and 20, will be urged forward, that is, to the left as seen in FIG. 2, until the shoulder 75' of the L-shaped ring 75 abuts the shoulder 79' on the fixed casing 70. At this time, the toothed clutch member 20 will be in engagement with the toothed clutch member 18 on the turbine shaft 16. A flexible coupling member 88 is fixed to the inner end of the sleeve 52 for rotation thereof, by means of a key 90 positioned in a slot or keyway 92 of sleeve 52. The coupling member 88 carries gear teeth 89 which engage an internally geared collar 91, at 91' The internal gearing 91' of collar 91 also engages a gear 89' on the main body of coupling 26.

For starting the turbine 10, the motor is then placed in operation to rotate members 52, 50 and 20 through the coupling 26 and the coupling member 88. During rotation of the sleeve 52 the clutch face 68 rotating therewith is in frictional engagement with the carbon block 66 and prevents passage of fluid medium such as helium from within the turbine housing 10 to the interior of the clutch housing 30.

The clutch mechanism is provided with suitable seals such as at 82' between members 52 and 68, 82 between members 66 and 67, and the plurality of seals 83 between 64 and 67, and the outer casing 70, thus further insuring against leakage of gas into the clutch housing.

Lubricating oil for the bearings 56 and 58 is provided by introduction of the oil through member 84 for communication with the bearings 56 and 58, with drainage of the bearing oil through the outlet at 86.

When the turbine has reached the desired predetermined speed and the turbomachinery system is now in operating equilibrium, the air pressure to passage 72 is then released, causing the spring 78 to expand and retract member 64 to the position shown in FIG. 2, to thereby retract members 52 and 50 and thus disengage the clutch member 20 from the mating member 18 of the turbine shaft, to the position shown in FIG. 1. Coupling collar 91 is disengaged from the gear teeth 89' on the main coupling 26, by first removing retaining ring 93, permitting retaining plate 93' and coupling 26 to be withdrawn from collar 91, and coupling 26 is thus removed from driving engagement with the sleeve 52 and is withdrawn with the gear box 24, coupling 22 and motor 14, from the clutch mechanism.

An end cap shown in phantom lines in FIG. 1 at 94 and having an outer flange 96 is then bolted at 98 to the rear flange 44 of the clutch housing extension 38, thus sealing the open end 99 of the rear portion of the clutch housing 38 from the atmosphere. The turbine can now operate in a normal manner over a long period of time with substantially no loss of expensive working medium such as helium to the atmosphere, through the clutch mechanism mounted on the turbine. The motor 14 and its associated coupling mechanisms can in the meantime be used for starting other turbines at remote places until such time as it is again desired to be employed for use in starting the turbine illustrated in the drawings. At that time, the end cap 94 can be unbolted from the end flange 44 of the clutch housing and the motor and its associated couplings then assembled in combination with the clutch mechanism in the manner described above for again starting the turbine.

It will be understood that the shaft 50 and clutch member 20 can be actuated by means other than air pressure, e.g., hydraulically, or by any other suitable means, for axial forward movement of the clutch member 20 into engagement with member 18 of the turbine shaft. Also, means other than a spring can be utilized for retracting members 50 and 20 from disengagement with turbine shaft 16, e.g., a magnetic solenoid.

While we have described particular embodiments of our invention for the purpose of illustration, it should be understood that various modifications and adaptations thereof may be made within the spirit of the invention and within the scope of the appended claims.

We claim:

1. A turbine starting system comprising a turbine including a turbine housing and a turbine shaft, clutch means connected to said turbine and including a clutch member mounted for engagement and disengagement with said turbine shaft, a housing for said clutch means and connected to said turbine housing, a motor, means for removably coupling said motor in driving engagement with said clutch means, and removable cap means for enclosing the end of said clutch housing when said motor is disengaged from said clutch means and is removed from the end of said clutch housing, to prevent gas leakage from the turbine to the atmosphere.

2. A turbine starting system as defined in claim 1, including means for axially moving said clutch member into engagement with said turbine shaft and means for retracting said clutch member to disengage same from said turbine shaft.

3. A turbine starting system as defined in claim 1, including sealing means mounted on said clutch means to minimize gas leakage from the interior of said turbine housing into the interior of said clutch housing.

4. A turbine starting system as defined in claim 2, including sealing means mounted on said clutch means to minimize gas leakage from the interior of said turbine housing into the interior of said clutch housing.

5. A turbine starting system as defined in claim 1, said clutch means including an elongated member, said clutch member mounted at one end of said elongated member for rotation therewith, said coupling means being adapted for engagement with the other end of said elongated member for drivingly rotating same, means for axially urging said elongated member in a direction to engage said clutch member with said turbine shaft, and means biasing said elongated member in the opposite direction to disengage said clutch member from said turbine shaft.

6. A turbine starting system as defined in claim 5, including sealing means mounted on said elongated member to minimize gas leakage from the interior of said turbine housing into the interior of said clutch housing.

7. A turbine starting system as defined in claim 1, said clutch housing being open at its outer end for engagement of said clutch means with said coupling means and said motor, said cap means including an end cap removably bolted to the open end of said clutch housing when said coupling means and said motor are disengaged from said clutch means and removed from said open end of said clutch housing.

8. A turbine starting system as defined in claim 6, said clutch housing being open at its outer end for engagement of said elongated member with said coupling means and said motor, said cap means including an end cap removably bolted to said open end of said clutch housing when said coupling means and said motor are disengaged from said elongated member and removed from said open end of said clutch housing.

9. A turbine starting system comprising a turbine including a turbine housing and a turbine shaft, clutch means connected to said turbine including a clutch member mounted for engagement and disengagement with said turbine shaft, a housing for said clutch means and connected to said turbine housing, a motor, said motor being removably engageable with said clutch means for driving same, and removable cap means for enclosing the end of said clutch housing when said motor is disengaged from said clutch means and is removed from the end of said clutch housing, to prevent gas leakage from the turbine to the atmosphere.

No references cited.

MARTIN P. SCHWADRON, *Primary Examiner.*

EVERETT A. POWELL, *Assistant Examiner.*